J. P. TARBOX.
AIRCRAFT.
APPLICATION FILED JULY 2, 1913.
1,230,443.
Patented June 19, 1917.
3 SHEETS—SHEET 3.
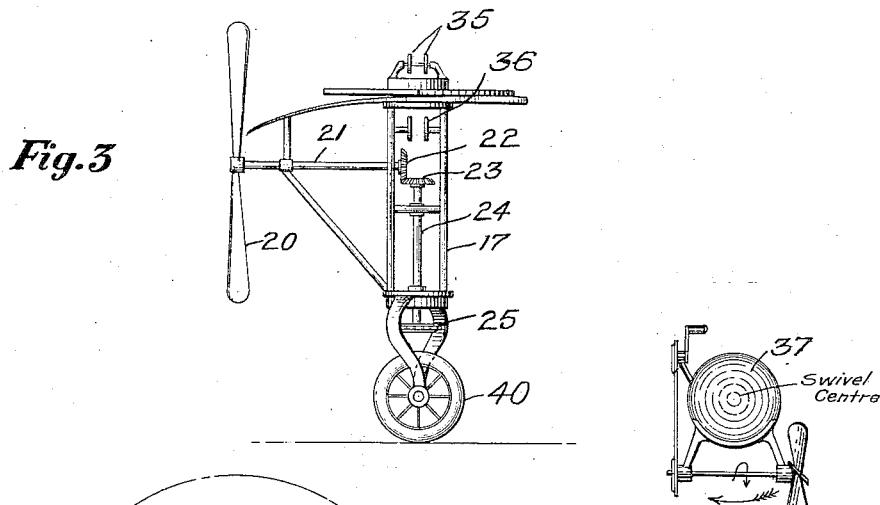
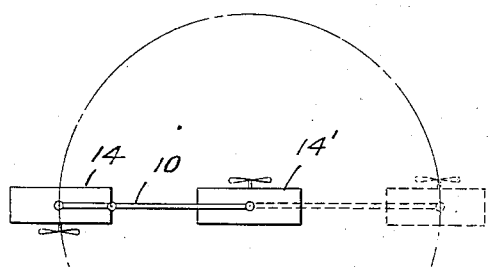
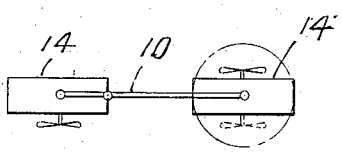
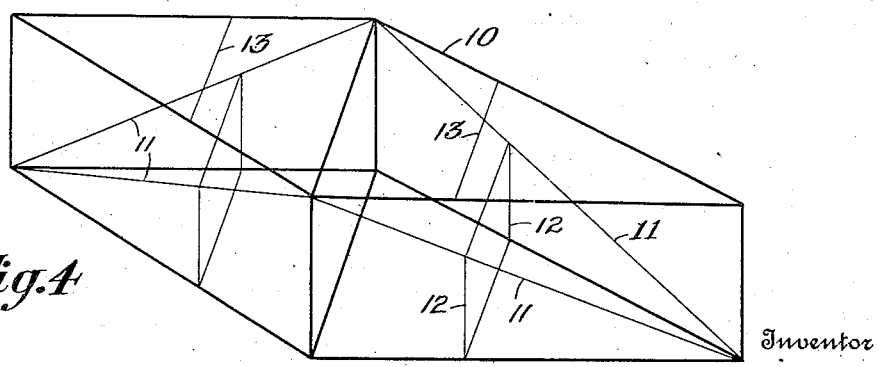

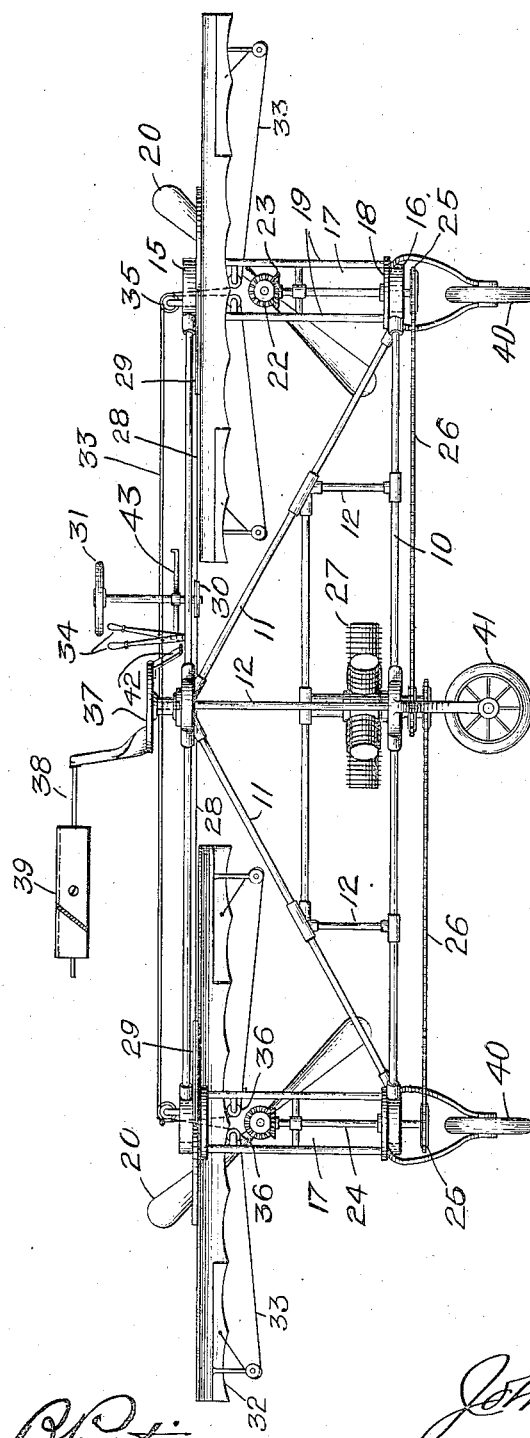

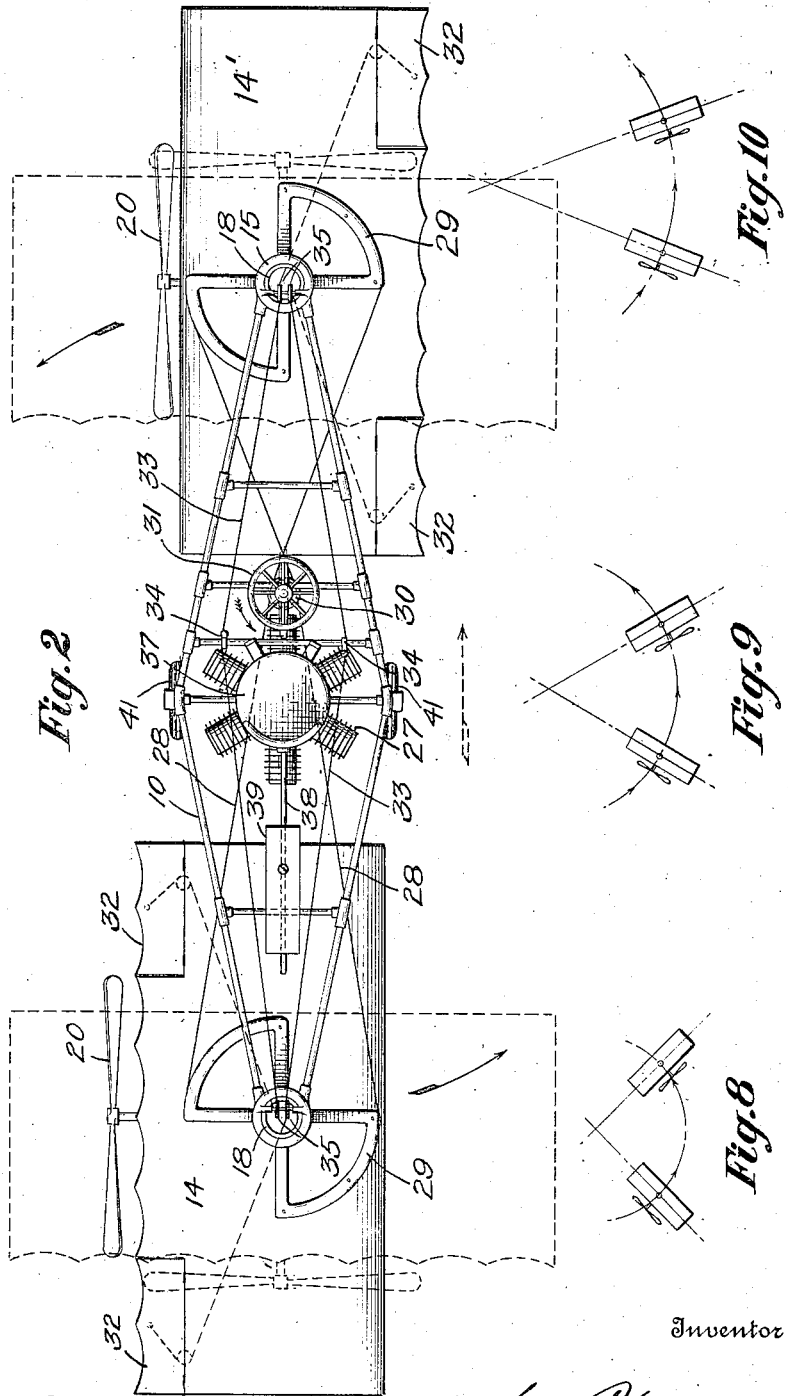

UNITED STATES PATENT OFFICE.

JOHN P. TARBOX, OF BUFFALO, NEW YORK, ASSIGNOR TO TARBOX SAFETY AIRCRAFT COMPANY, A CORPORATION OF DELAWARE.

AIRCRAFT.

1,230,443.

Specification of Letters Patent. Patented June 19, 1917.

Application filed July 2, 1913. Serial No. 776,979.

*To all whom it may concern:*

Be it known that I, JOHN P. TARBOX, a citizen of the United States, residing at Buffalo, county of Erie, State of New York, have invented new and useful Improvements in Aircraft, of which the following is a specification.

My invention relates to aeroplanes, and has for its principal object the production of a structure which is capable of arising and alighting without the usual longitudinal running along the ground. In the use of aeroplanes many difficulties are encountered, and many accidents result, by reason of the rough ground upon which a landing must be made, and after landing it is often difficult or even impossible to rise again from the ground.

In carrying my invention into effect I provide an aeroplane which is capable of straight line and curved line flights in the usual manner, and in addition is so constructed that it operates as a helicopter for vertical flights and in arising from and alighting upon the ground. I have produced therefore what I believe to be a new type of machine, which may be termed a "helicoplane."

In my helicoplane, the supporting planes are divided into sections which are capable of being given different relative positions with respect to each other. In one or more of these positions the structure as a whole acts as an ordinary aeroplane; while in another of these positions the sections of the supporting planes follow each other around some point in the structure as a center, and hence a helicopter action is produced. There are, of course, many intermediate positions between the extremes, and suitable means are provided for controlling the changes from one position to another and for at all times controlling and balancing the craft.

The invention consists in the novel construction of parts hereinafter described and claimed and illustrated in the drawings in which—

Figure 1 shows the machine in side elevation ready to rise by gyratory motion;

Fig. 2 is a plan view of the same in the same position, but showing in dotted lines the positions of the parts for straight line flight;

Fig. 3 is a partial end elevation;

Fig. 4 is a diagram of the main frame of the machine;

Figs. 5 to 10 are diagrammatic views of the various intermediate positions which the supporting surfaces are given in shifting from gyratory to straight line flight; and Figs. 11 and 12 illustrate diagrammatically a modified form.

Fig. 13 is a plan view of the operator's seat, equipped with a hand operated fan wheel on an axis at right angles to a radius from the center thereof.

The main frame, Figs. 1 and 2, is designated 10. It is diamond-shaped in plan and as clearly shown in Fig. 4 is of tetrahedral construction, whereby it is given very great strength. This construction includes diagonal braces 11 between its upper center and lower outer corners, together with suitable vertical and transverse struts 12 and 13.

Two lifting surfaces 14, 14' are mounted for relative angular movement in large bearings 15, 16 at the outer extremities of the frame 10, by means of a rigidly connected frame 17 formed by upper and lower journal rings 18 rigidly connected together by diagonally spaced rods 19.

A propeller 20 is associated with each surface 14, 14', being mounted in each case on a transversely journaled shaft 21 (Fig. 3), the axis of which intersects the vertical line passing through the center of pressure of the surface. This center of pressure coincides with the vertical pivotal axis of the surface. Gears 22 on the inner ends of the shafts 21 mesh with gears 23 on shafts 24 journaled in the frames 17 on the lines of the pivotal axes of the surfaces 14. Sprockets 25 on the lower ends of shafts 24 are connected by chains 26 with revolving cylinder motor 27 mounted centrally of the frame 10 with its axis lying substantially within the common plane of the shafts 24.

Surfaces 14, 14' are connected together by crossed cables 28 which connect with sectors 29 fixed to the respective surfaces, and which cables are operatively engaged by vertically mounted drum 30 on frame 10. An operator's hand-wheel 31 is provided for operating this drum 30 and moving the surfaces 14, 14' with respect to each other.

A lateral balancing device 32 of any desired type is provided at each lateral extremity of each of the surfaces 14, 14'. Diagonally opposite balancing devices are interconnected by operating cords or cables 33 for independent movement in pairs. The term "diagonally" is used with respect to the positions which the balancing devices 32 occupy when the surfaces 14, 14' are in their dotted line positions. Separate levers 34 are provided on the frame 10 on opposite sides of wheel 31 for operating the balancing devices 32 through the cables 33. It will be observed that the cables are passed over pulleys 35, 36 located with their guiding peripheries substantially tangent to the pivotal axes of the surfaces 14, 14', whereby alteration in the length of the paths of the cables 33 is not brought about when the surfaces 14, 14' are shifted.

The seat 37 for the operator is swivelly mounted on top of the frame 10 and at the center thereof with the swivel of the seat in substantially coincidence with the vertical axis of the motor 27. The controlling levers 34 and wheel 31 are within easy reach of the seat. Attached to the back thereof above the plane of the wheel 31 and the tops of the levers 34 is a rearwardly extending rod 38 carrying a vane 39 inclined to the horizontal, as indicated in the imposed section.

Connected with each surface 14, 14' is a wheel 40 of the running gear. This connection is made to the bearing rings 18 of the frame 17 whereby the wheels 40 which are fixed in planes transversely of the surfaces 14, 14' are shifted when the surfaces are shifted. Other wheels 41 of the running gear are connected fixedly to transversely opposite points on the frame 10.

The operation of the machine is as follows: With the surfaces 14, 14' in the full line position shown in Figs. 1 and 2, the motor is started (and may be controlled by any suitable means, carried up within reach of the operator in any suitable manner, preferably through the swivel of the seat 37 in the same manner as the cords 33 are carried through the pivotal connections of the surfaces 14, 14'). The operator being in his seat 37, the machine is released and immediately commences a gyratory movement, propeller 20 associated with the left-hand surface 14, pushing that surface in the direction shown by the arrow in front of the surface, and the propeller 20 (of the tractor type) associated with the right-hand surface 14', pulling that surface in the direction of the arrow shown in its front. This movement is illustrated diagrammatically in Fig. 5, the propellers 20 for the sake of clarity being both shown as of the impelling type. When the gyratory speed becomes sufficient to give the surfaces 14, 14' sufficient lifting power, the machine rises vertically from the earth. It takes but a few seconds to attain this speed. As the machine rises, the reaction of the air upon the inclined vane 39 attached to the operator's seat 37 creates a torque on the seat 37 in a direction opposite to the direction of gyration of the machine and the operator is thus not revolved with the machine. Thus, although the number of gyrations of the machine a minute is very small and its movement comparatively slow, the operator is not subjected to the influence of being revolved with the machine and thereby possibly losing his bearings. During the initial gyration, the wheels 40 and 41 of the running gear track in concentric circles.

Having reached a suitable height for any purpose, the operator by throttling the motor may maintain the machine at that height for as long a period as desired, or else by increasing or decreasing the power of the motor, he may increase or decrease his altitude at will. By decreasing the power of the motor skilfully, a landing by vertical descent may be made with the greatest ease and safety.

However, it will usually be desired that the machine be propelled in cross country flight for some distance before descending. Having attained the desired height for this flight, the operator simply removes his feet from the rests 42 connected with the swiveled seat, and places them upon the frame 10, simultaneously grasping the wheel 31 whereupon he no longer faces in a given direction, but revolves with the machine in its gyration. He immediately, however, turns the wheel 31 in the direction shown by the arrow associated therewith, whereupon in a few seconds of time, the surfaces 14 are shifted angularly in opposite directions to the positions shown in dotted lines, whereupon the machine will follow a straight line flight, gyratory or circular movement having been altogether eliminated. During this shifting the surfaces take successively the positions shown diagrammatically in Figs. 5 to 10. In the first shift of ten or fifteen degrees, it will be noticed that the true gyratory motion is replaced by a combined movement in which the surface 14, 14', still gyrate around a point as a center, but as they no longer move in exactly opposite directions this point is displaced with respect to the center of the machine and the entire machine therefore begins to travel bodily in a circular path. As the angle of the surfaces to each other is increased the radius of the circular path of travel of the machine is increased, but the gyratory motion gradually decreased owing to the decrease in the component of the propelling force at right angles to the longitudinal axis of the craft. In the thirty degree position and in the forty-five degree position shown in Figs. 7 and 8, the gyratory motion will have still further decreased, and the machine will have a circular travel on a path of still greater radius. And finally in the positions shown in Figs. 9 and 10 the gyratory motion will have become so slow, and the rate of travel on a circle of large radius so high, that the machine will stop its gyratory motion altogether, and partake entirely of travel in a curved path on a circle of very great radius. In the final movement of the surfaces 14, 14' all movement on the circle of large radius is reduced to movement on a straight line. The machine thereupon travels as the ordinary tandem machine comprising following planes.

Having reached the position of straight line flight, the machine is steered by simply altering slightly to the right or the left the relative positions of the surfaces 14, 14' whereupon instead of traveling in a straight line, the machine travels as shown in Fig. 10 upon an arc of a circle of greater or less radius. Thus no vertical rudder is necessary for the machine. The operator thereupon may place his feet upon the steering lever 43 connected with the steering wheel 31 and steer the craft by movement of his feet, using his hands for the operation of the levers 34 connected with the balancing devices 32.

By moving the levers 34 independently, depending upon the direction of the unbalancing, the craft may readily be restored to its position of proper balance as is usual. A craft of the tandem type usually becomes unbalanced about a diagonal thereof, and it is for this reason that the diagonally opposite balancing devices 32 are connected together for simultaneous operation.

The machine needs no horizontal rudder. By simply moving the levers 34 simultaneously in the same direction, backward or forward, the balancing devices 32 connected with the leading plane 14' are moved oppositely from the pair connected with the trailing plane 14, whereby the craft may be freely steered up or down at will.

When the surfaces 14, 14' were shifted for straight line flight, the wheels 40 of the running gear were also shifted, and hence having taken straight line flight, the machine may land or rise in straight line flight, the wheels 40 then tracking in straight line paths parallel to the wheels 41.

Having made a straight line flight and desiring to land in a limited space, the operator has only to shift the surfaces 14, 14' reversely, whereupon the machine resumes gradually its gyratory movement and the machine will, when the motor is throttled down, sink slowly to the desired landing place.

Obviously many modifications in detail may be carried out by those skilled in the art without in any way departing from the generic spirit of my invention. For instance the frame 10 may be made of other shape. So also the surfaces 14, 14' may be made of different relative shape (as is common in the well-known tandem machines), and may be given different relative inclines as respects each other. I desire particularly to point out that the surfaces 14, 14' may each be constructed with portions lying on opposite sides of the pivotal axis thereof at a dihedral angle. The use of following planes, each comprising surfaces at a dihedral angle, characterizes the Langley machines. So also the means of swiveling the operator's seat and of preventing rotation thereof may be varied to a large extent. Hand operated propellers of smaller size may be associated therewith as shown in Fig. 14.

A modification of the connection of surfaces 14, 14' with frame 10 is diagrammatically shown in Figs. 11 and 12. In this case surface 14 is rigidly connected with frame 10, while surface 14' only is movable. In such case during the shifting from gyratory movement to circular and straight line travel, the one surface 14 may move around the pivotal axis of the other, as shown in Fig. 11, or the single movable surface 14' may be shifted around its own pivotal axis. The result in each case is the same. The shifting is accomplished and the machine during the shifting gradually takes upon itself a greater proportion of circular travel and a less proportion of gyratory travel and finally partakes of circular travel altogether, whereupon straight line travel may be invoked by the final movement of the wheel 31.

What I claim is:

1. An air craft comprising a main frame and two lifting surfaces connected thereto at points longitudinally spaced apart and for relative horizontal angular movement with respect to each other, means connected with said frame and having operative connections with said surfaces for adjusting said surfaces with respect to each other in various positions from positions in which they face in opposite directions to positions in which they face in the same direction, and for holding said surfaces in an adjusted position for flight, and driving means propelling said surfaces in the directions in which they face.

2. An air craft comprising a main frame and two lifting surfaces connected thereto at points longitudinally spaced apart and for relative horizontal angular movement with respect to each other, each of said surfaces having a propeller rotatable about a relatively fixed horizontal axis transversely thereof, means for driving said propellers, and means connected with the said frame for shifting said surfaces with respect to each other from positions in which they face and are driven in opposite directions to positions in which they face and are driven in the same direction.

3. An air craft comprising a main frame and two lifting surfaces connected thereto at points longitudinally spaced apart and for relative horizontal angular movement with respect to each other, said surfaces having substantially equal lifting power when driven at the same speed and being connected with said frame substantially at their centers of pressure, a seat for an operator, means connected with said frame and operable from said seat for adjusting said surfaces with respect to each other from positions in which they face in opposite directions to positions in which they face in the same direction, and means for driving said surfaces in the directions in which they face.

4. In combination, a rotary frame, a support for a passenger swivelly connected thereto, a surface inclined to the line of vertical advance connected with said passenger support and acted upon by the air through which said surface passes to counteract the tendency of said passenger support to rotate with said supporting frame, and supporting surfaces mounted on said frame and controlled from said passenger support to operate as a convertible helicopter and aeroplane.

5. An air craft comprising a main frame and two lifting surfaces connected thereto at points longitudinally spaced apart and for relative horizontal angular movement with respect to each other, a swivel seat for the operator, means connected with said frame and operable from said seat for adjusting said surfaces in opposite angular directions with respect to each other to bring them into various positions from positions in which they face in opposite directions to positions in which they face in the same direction, and for holding said surfaces in an adjusted position for flight.

6. An air craft comprising a main frame and two lifting surfaces connected thereto at points longitudinally spaced apart and for relative horizontal angular movement with respect to each other, means connected with said frame for shifting said surfaces with respect to each other from positions in which they face in opposite directions to positions in which they face in the same direction, driving means propelling said surfaces in the directions in which they face, and a balancing means at each side of a medial fore and aft plane of each surface together with independently operable connections extending between diagonally opposite balancing devices.

7. An air craft comprising a main frame and two lifting surfaces connected thereto at points longitudinally spaced apart and for relative horizontal angular movement with respect to each other, each of said surfaces having a propeller rotatable about a relatively fixed horizontal axis transversely thereof, said propellers being mounted one to pull and the other to push its associated surface, means for driving said propellers, and means connected with the said frame for shifting said surfaces with respect to each other from positions in which they face and are driven in opposite directions to positions in which they face and are driven in the same direction.

8. An aeroplane of the tandem type comprising following supporting surfaces each having a substantially vertical pivotal connection with a common longitudinally extending frame, and means for laterally steering said aeroplane comprising connections between said surfaces whereby they may be moved about their points of connection with said frame simultaneously in opposite directions.

9. An aircraft comprising a main frame elongated in shape and tapering symmetrically toward each end, and a pair of lifting surfaces connected pivotally thereto at the extremities thereof respectively and arranged to assume relatively fixed positions facing in opposite directions and also in the same direction.

10. An aircraft comprising a main frame of tetrahedral construction and longitudinally of diamond shape having forked longitudinal extremities; and a pair of lifting surfaces pivotally supported respectively between the said forked end portions of the frame and arranged to assume relatively fixed positions facing in opposite directions and also in the same direction.

11. An aircraft comprising a main frame and two lifting surfaces connected thereto at points longitudinally spaced apart and arranged to assume relatively fixed positions facing in opposite directions and also in the same direction, together with balancing means for the aircraft mounted on said surfaces and operating connections to said balancing devices extending from the main frame thereto by way of the connections of the surfaces with the frame.

12. An aircraft comprising a main frame and two lifting surfaces connected thereto by means of hollow pivotal connections at points spaced longitudinally apart and arranged to assume relatively fixed positions facing in opposite directions and also in the same directions, together with balancing means for the said craft supported from said surfaces and operating connections from said main frame thereto which extends through the said hollow pivotal connections of the surface with the frame.

13. An aircraft comprising a main frame and two lifting surfaces connected thereto at points spaced longitudinally apart and arranged to assume relatively fixed positions, facing in opposite directions and also in the same direction, a support for a passenger swively mounted upon said main frame, means connected with said passenger support and extending to counteract the tendency of said support to rotate when said main frame rotates, and means controlled from said support for moving said lifting surfaces from one position to another.

14. An aircraft comprising a main frame and two lifting surfaces connected thereto at points longitudinally spaced apart and arranged to assume relatively fixed positions facing in opposite directions and also in the same direction, together with a support for an operator swively mounted upon said main frame and balancing means for the air craft mounted on said surfaces and controllable by an operator upon said support to balance the craft in all positions of said lifting surfaces.

15. An aircraft comprising a main frame and two lifting surfaces connected thereto at points longitudinally spaced apart and arranged to assume relatively fixed positions facing in opposite directions and also in the same direction, a propeller mounted to cooperate with each of said lifting surfaces in its respective positions, and a motor mounted on said main frame and geared to each of said propellers to drive the same in all positions of said lifting surfaces.

16. An aeroplane comprising two supporting surfaces and means for positioning said surfaces with relation to each other to operate as a convertible helicopter and aeroplane together with lateral balancing means at the lateral extremities of said shiftable surfaces commonly operable from a common point intermediate the surfaces.

17. An aeroplane comprising two supporting surfaces and means for positioning said surfaces with relation to each other to operate as a convertible helicopter and aeroplane together with shifting means for so positioning said surfaces common to said surfaces and operable from a point intermediate the same.

In testimony whereof I have hereunto set my hand in presence of two subscribing witnesses.

JOHN P. TARBOX.

Witnesses:
E. H. McLachlen,
Thomas W. Norman.